United States Patent [19]

Takahashi et al.

[11] Patent Number: 4,993,743
[45] Date of Patent: Feb. 19, 1991

[54] FOLDING AND LOCK MECHANISM FOR PUSHCART

[75] Inventors: Takehiko Takahashi; Hideo Saito; Takashi Watanabe; Tomihiro Kaneko, all of Tokyo, Japan

[73] Assignee: Combi Co., Ltd., Tokyo, Japan

[21] Appl. No.: 376,734

[22] Filed: Jul. 7, 1989

[30] Foreign Application Priority Data

Jul. 8, 1988 [JP] Japan ................... 63-90032[U]

[51] Int. Cl.<sup>5</sup> ............................................. B62B 7/08
[52] U.S. Cl. ................................ 280/642; 280/647; 280/650; 280/658; 403/85; 403/330
[58] Field of Search ............... 280/658, 650, 649, 647, 280/644, 642, 47.38; 403/85, 165, 330

[56] References Cited

U.S. PATENT DOCUMENTS 4,616,844 10/1986 Kassai .......................... 280/658
4,828,278 5/1989 Nakao et al. .................. 280/650

*Primary Examiner*—Charles A. Marmor
*Assistant Examiner*—Eric Culbreth
*Attorney, Agent, or Firm*—Sughrue, Mion, Zinn, Macpeak & Seas

[57] ABSTRACT

A folding and lock mechanism for a pushcart includes a bracket pivotally mounted at its proximal end on a rear face of a rear leg intermediate opposite ends of the rear leg so that the bracket can be pivotally moved along the rear face of the rear leg between a generally upstanding position and a lower position. A retainer plate is formed on a lower end of a handle grip, and has a bifurcated end of a generally L-shape or inverted Y-shape defined by a pair of engaging arms. The retainer plate is pivotally connected to the distal end of the bracket at that portion of the retainer plate where the pair of engaging arms merge together. One of the two engaging arms is fitted in a groove formed in the distal end of the bracket to maintain the assembled condition of the pushcart whereas the other engaging arm is fitted in the groove to maintain the folded condition of the pushcart. A tubular stopper is fitted on the distal end portion of the bracket and is slidingly movable along the bracket. The stopper is able to fit on and retain either of the pair of engaging arms which is selectively fitted in the distal end of the bracket.

8 Claims, 9 Drawing Sheets

FOLDING AND LOCK MECHANISM FOR PUSHCART

BACKGROUND OF THE INVENTION

1. Field of the Invention

This invention relates generally to an improved pushcart of the type including a frame or body capable of being folded for storage purposes, such as a shopping pushcart of the type used by people who may have difficulty walking, such as the aged and the physically handicapped, and a baby carriage. More specifically, the invention relates to a folding and lock mechanism for such a pushcart in which a folding mechanism can positively maintain the folded and assembled conditions.

2. Prior Art

Shopping pushcarts are known for use having difficulty walking, such as the aged and the physically handicapped. Such pushcarts may be used as a walking support device and a chair to rest from walking. Also, a baby carriage has been conventionally used to take a baby or infant outdoors to give the baby a sunbath or just for strolling purposes.

Such shopping pushcart and baby carriage have been improved so that they can be folded up and stored in a compact manner, thus saving a storage space. With such a foldable construction, such pushcart can be brought into public transport facilities (e.g., trains), and therefore such pushcarts, which have heretofore been used only in the neighborhood of the user, can now be transported easily by the owner to distant places.

In most cases, the folding mechanism for such a pushcart is provided at a position where the legs of the frame are connected to a lower end of a handle grip, and by operating the folding mechanism, the pushcart is brought into its assembled or its folded condition.

What is most important with respect to the folding mechanism is that it can be accurately operated by simple manipulation, and the folding mechanism is required to accurately maintain the folded condition. Also, the assembled condition needs to be accurately maintained. At present, although much attention is drawn to the mechanism for accurately maintaining the assembled condition of the pushcart, there are few constructions for accurately maintaining the folded condition for storage purposes. There have been occasions when the folded pushcart is accidentally extended into an assembled condition due to some vibration or other slight shock. Particularly, this trouble is often experienced when the pushcart or baby carriage is brought into public transport facilities (e.g., a train) which are always subjected to vibration. It has therefore been desired in the trade to solve such a problem.

SUMMARY OF THE INVENTION

It is therefore an object of this invention to provide a folding and lock mechanism for a pushcart or the like which can be easily manipulated to effect the folding and assembling operations, and can accurately and safely maintain and lock the pushcart in the assembled and folded conditions.

Another object of the invention is to provide such a folding and lock mechanism which can be operated by one touch to effect the folding and assembling operations, and in which a folding mechanism, when operated, is automatically returned to its initial position in accordance with the folding operation.

According to the present invention, there is provided a folding and lock mechanism for a pushcart, comprising:

a bracket pivotally mounted at its proximal end on a rear face of a rear leg intermediate opposite ends of said rear leg so that said bracket can be pivotally moved along the rear face of said rear leg between a generally upstanding position and a lower position, said rear leg constituting part of a frame of the pushcart;

a retainer plate formed on a lower end of a handle grip, said retainer plate having a bifurcated end of a generally L-shape or inverted Y-shape defined by a pair of engaging arms, said retainer plate being pivotally connected to the distal end of said bracket at that portion of said retainer plate where said pair of engaging arms merge together; and a tubular stopper fitted on the distal end portion of said bracket and being slidingly movable along said bracket, said stopper being able to fit on and retain either of said pair of engaging arms which is selectively fitted in the distal end of said bracket.

DESCRIPTION OF THE PREFERRED EMBODIMENTS OF THE INVENTION

Figure 1:
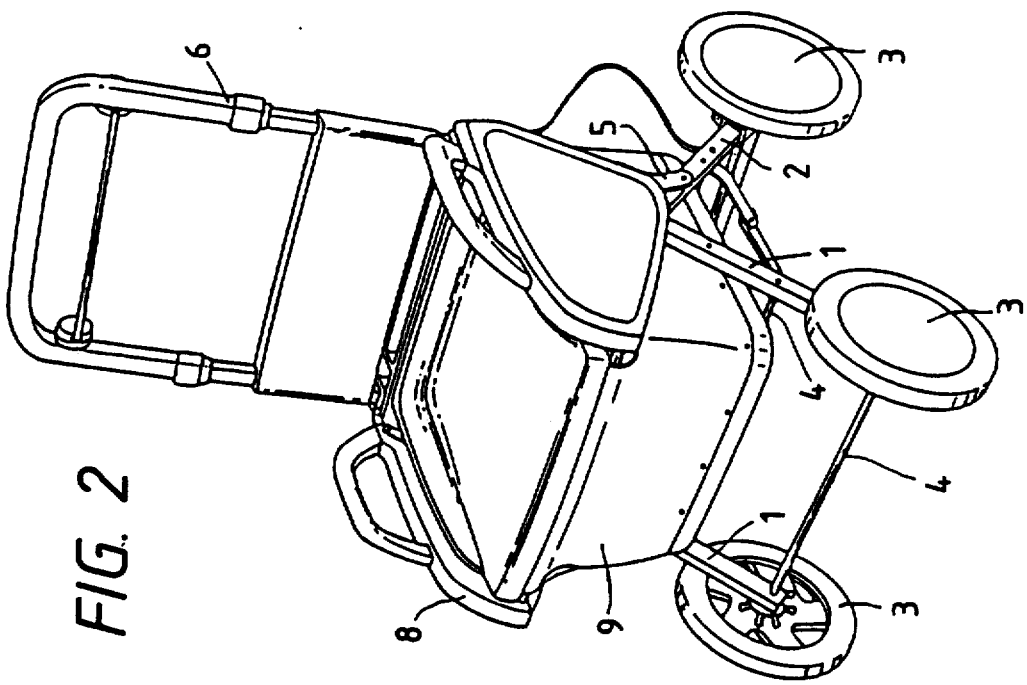
FIG. 1 is a perspective view of a pushcart provided in accordance with the present invention and shown in its use as a shopping pushcart.

The invention will now be described with reference to the drawings.

The invention is embodied in a shopping pushcart 10 which can serve as a walking supportive device and a chair to be used to rest from walking. The pushcart comprises a pair of front legs 1 and 1, and a pair of rear legs 2 connecting bars 4 extending between the front legs and also between the rear legs. Each pair of front and rear legs 1 and 2 is foldably connected together in the shape of an X as viewed from the side of the pushcart. Wheels 3 are mounted on the lower ends of the front and rear legs 1 and 2. A handle grip 6 is connected to the pair of rear legs 2 and 2 through brackets 5 and 5. Each bracket 5 is pivotally mounted on the rear face of the rear leg 2 intermediate the opposite ends of the rear leg 2 so that the bracket 5 can be pivotally moved between an upper upstanding position and a lower position. A frame or body of the pushcart is constituted by the above component parts.

A pair of side bars 7 and 7 are pivotally connected respectively to the upper ends of the rear legs 2 and also pivotally connected respectively to the lower end portions of the handle grip 6. Thus, the side bars 7 are foldably connected to the rear legs 2 and the handle grip 6. A seat frame 8, which is made of a synthetic resin and has a U-shape as viewed from the top thereof, is mounted on the side bars 7 and 7. An article-holding bag 9 is suspended from the seat frame 8.

The bracket 5 of a generally V-shape has grooves 51 and 51 formed respectively in the opposite ends thereof, the grooves 51 being disposed substantially centrally of the thickness of the bracket 5 and having a depth in the direction of the length of the bracket 5. Thus, the opposite ends of the bracket 5 are bifurcated. One bifurcated end of the bracket 5 is fitted on and pivotally connected to the rear leg 2 so that the bracket 5 can be pivotally moved between the generally upstanding position and lower position at the position rearwardly of the rear leg 2. The other bifurcated end of the bracket 5 is fitted on and pivotally connected to a retainer plate 61 formed at the lower end of the handle grip 6.

The retainer plate 61 has a bifurcated proximal end of a generally L-shape or inverted Y-shape defined by two engaging arms 61a and 61b. That portion of the retainer plate 61 where the two engaging arms 61a and 61b merge together is received in and pivotally connected to the bifurcated end of the bracket 5 having the groove 51, so that the engaging arms can be angularly moved.

A stopper 10 is slidably fitted on the bracket 5 adjacent to the distal end of the bracket 5; the stopper 10 comprising a tubular body having a predetermined length. The tubular stopper 10 has a stop-maintaining plate 11 of a suitable length extending axially from one side wall of the tubular stopper 10 and having a retainer pawl 11a at its distal end.

The stopper 10 is normally urged toward the handle grip 6 by a spring 12 mounted within the bracket 5, so that one of the engaging arms 61a and 61b received in the groove 51 is prevented from disengaging therefrom.

A manipulation thumbpiece 101 is formed on the outer surface of the stopper 10, and the stopper 10 can be easily moved downwardly by manipulating the thumbpiece 101 with the finger.

When the stopper 10 is retracted from the distal end of the bracket 5 so as to effect the folding operation, the stop-maintaining plate 11 extending from the side wall of the stopper 10 temporarily maintains the stopper 10 in the retracted position so that the engaging arm 61a or 61b can be disengaged from the groove 51. Thus, the stop-maintaining plate 11 serves as a retainer means.

A retainer member 13 serves to temporarily retain the retainer pawl 11a. The retainer member 13 is mounted on the upper end of the front leg 1 and extends therefrom, and has at its distal end a retainer portion 13a of an inverted L-shape lockingly engageable with the retainer pawl 11a.

In the embodiment illustrated in FIGS. 4 to 9, when the stopper 10 slides along the bracket 5, the retainer pawl 11a of the stop-maintaining plate 11 extending integrally from the side wall of the stopper 10 is engaged with the inverted L-shaped retainer portion 13a of the retainer member 13 extending from the upper end portion of the front leg 1. However, the retainer means for temporarily stopping the stopper 10 is not restricted to such a construction. For example, this retainer means can be replaced by that shown in FIGS. 10 to 20 showing another embodiment of the invention which will be described below.

More specifically, in the embodiment shown in FIGS. 10 to 20, a retainer pawl 11a of a stop-maintaining plate 11 axially extending integrally from the side wall of the stopper 10 is engageable with a projection 52 formed on and projecting slightly from the inner surface of the bent portion of the bracket 5. In this retained condition, the underside of the stop-maintaining plate 11 is held in contact with an operating projection 14a formed at a distal end of a raising plate 14 extending from the upper end portion of the front leg 1.

Figure 11:
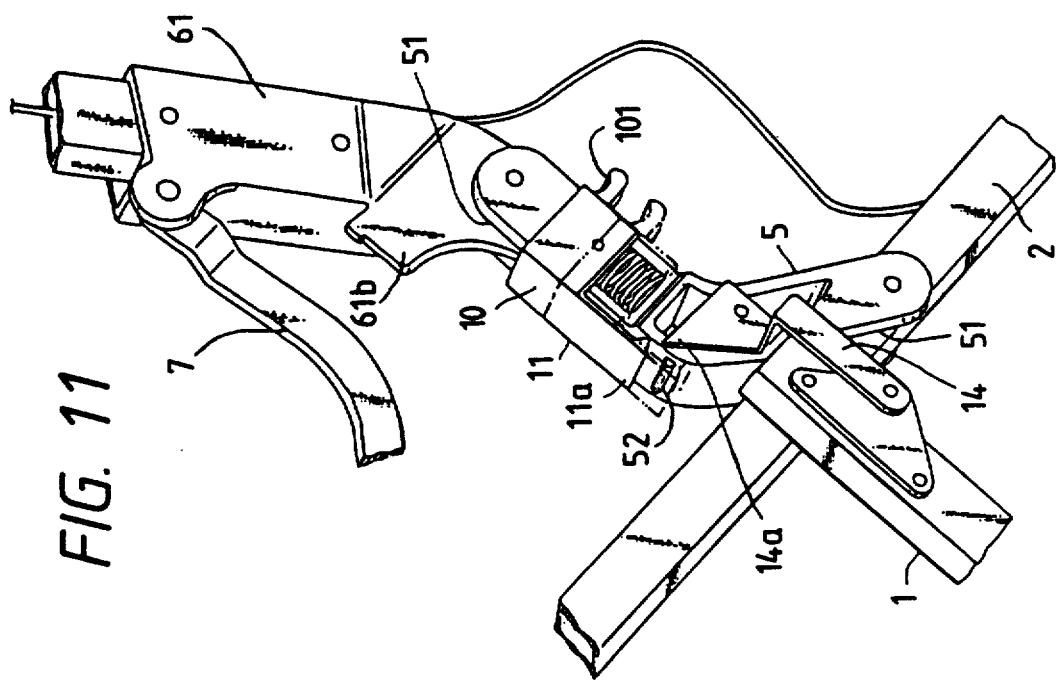
FIG. 11 is an enlarged perspective view of a portion of the pushcart of FIG. 10.
Figure 10:
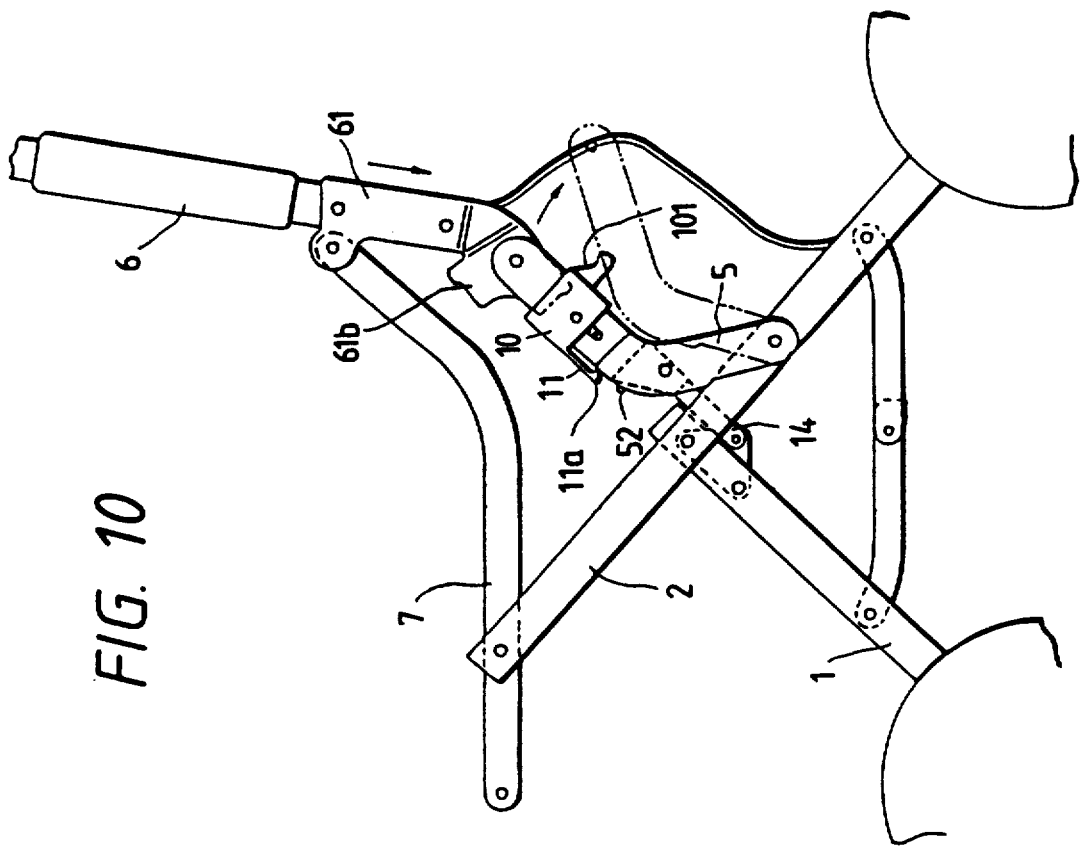
FIG. 10 is an enlarged side-elevational view of a portion of a modified pushcart.
Figure 12:
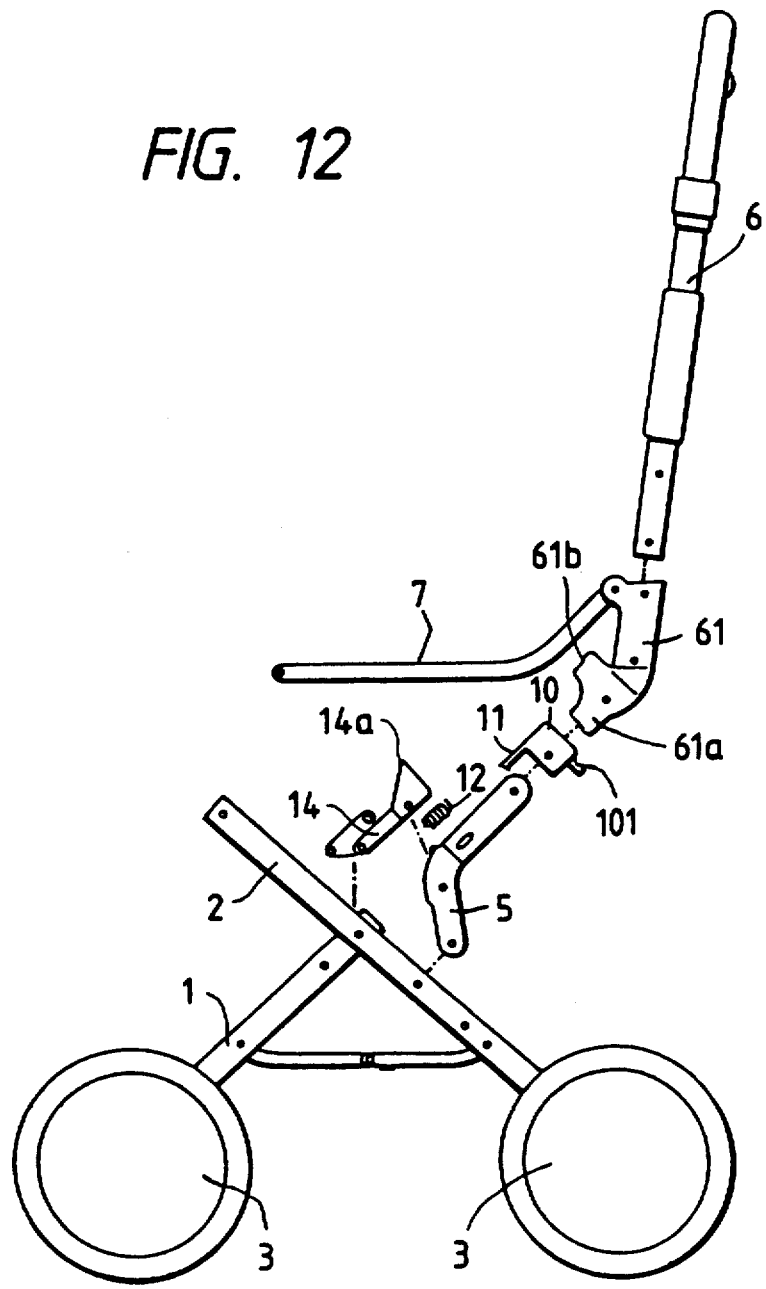
FIG. 12 is an exploded side-elevational view of a portion of the pushcart of FIG. 10.

As best shown in FIGS. 10 to 12, the raising plate 14 comprises a plate having the operating projection 14a at its distal end. The tip end of the operating projection 14a is disposed slightly beyond an arc generated by the retainer projection 11a on the inner face of the stop-maintaining plate 11 when the bracket 5 is pivotally moved at the position rearwardly of the rear leg 2 to effect the folding operation.

The operation of the invention will now be described.

1. Folding Operation (i) The Construction Shown in FIGS. 3 to 9

Figure 2:
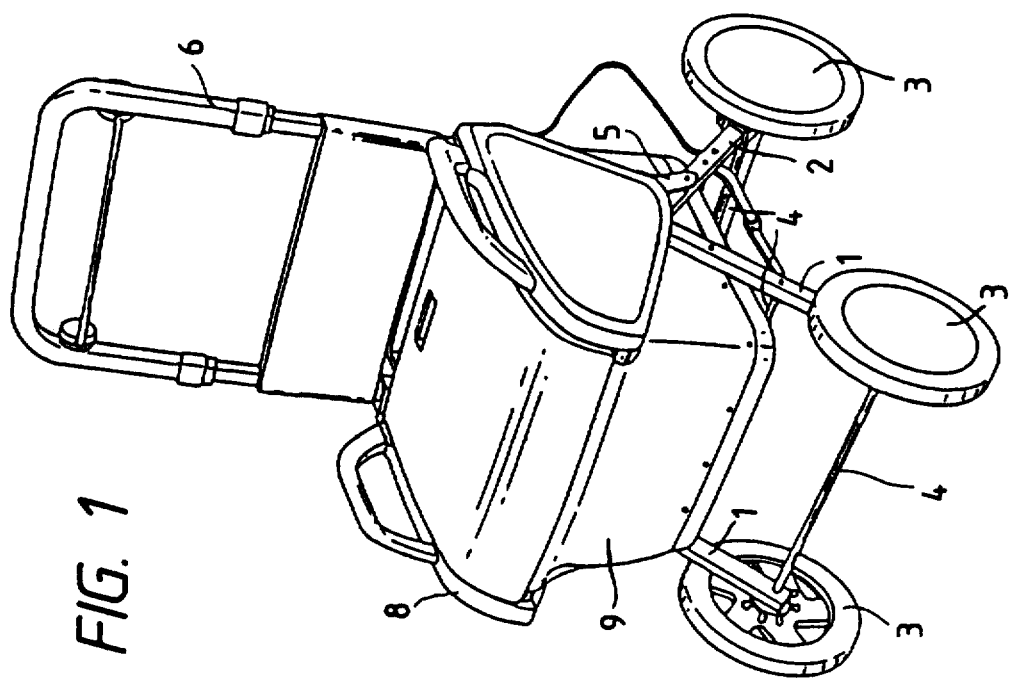
FIG. 2 is a view similar to FIG. 1, but showing a lid in a reverse condition so that the pushcart can be used as a chair.
Figure 4:
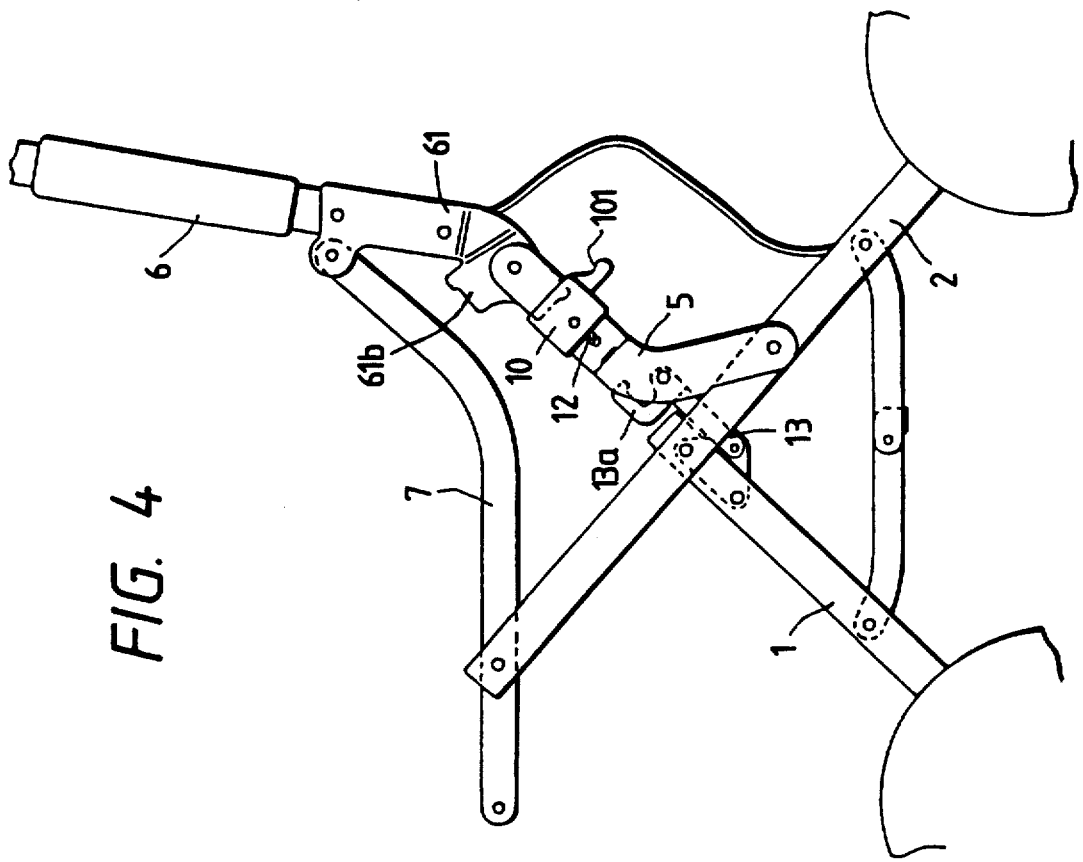
FIG. 4 is an enlarged side-elevational view of a portion of the pushcart.
Figure 3:
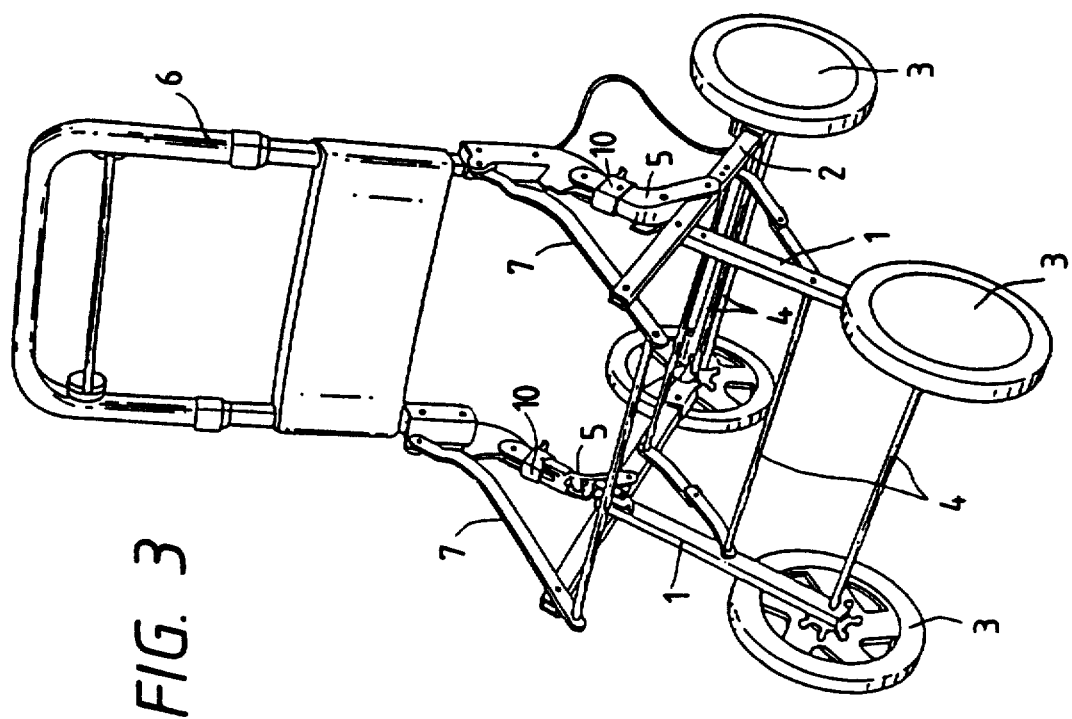
FIG. 3 is a perspective view of a portion of the pushcart, with a seat portion and an article-holding bag omitted.
Figure 5:
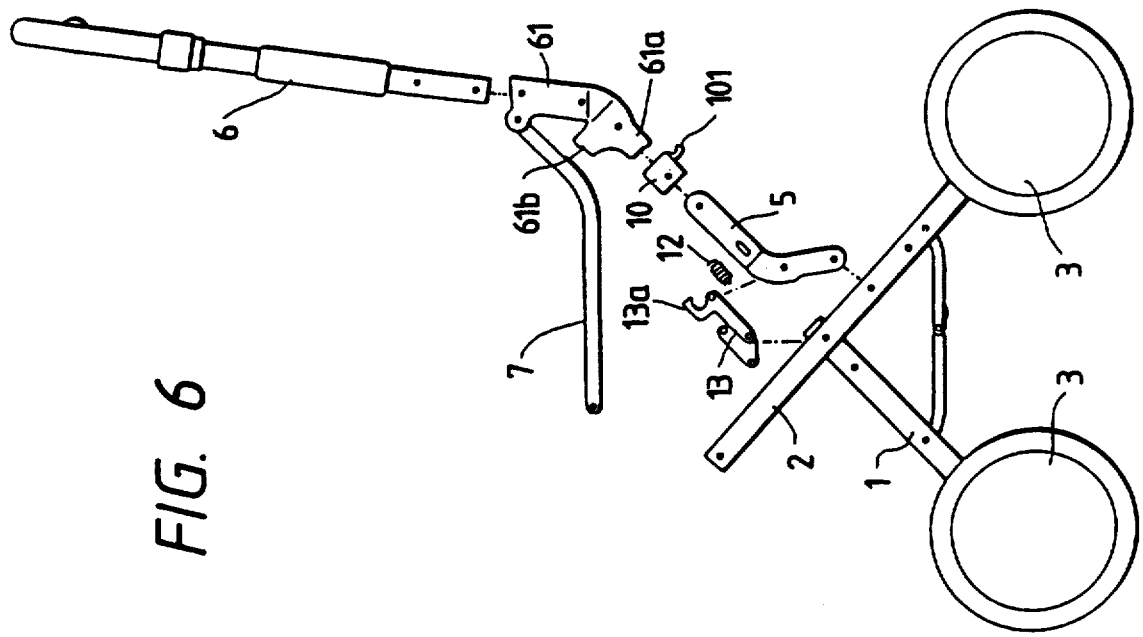
FIG. 5 is an enlarged perspective view of a portion of the pushcart.
Figure 6:
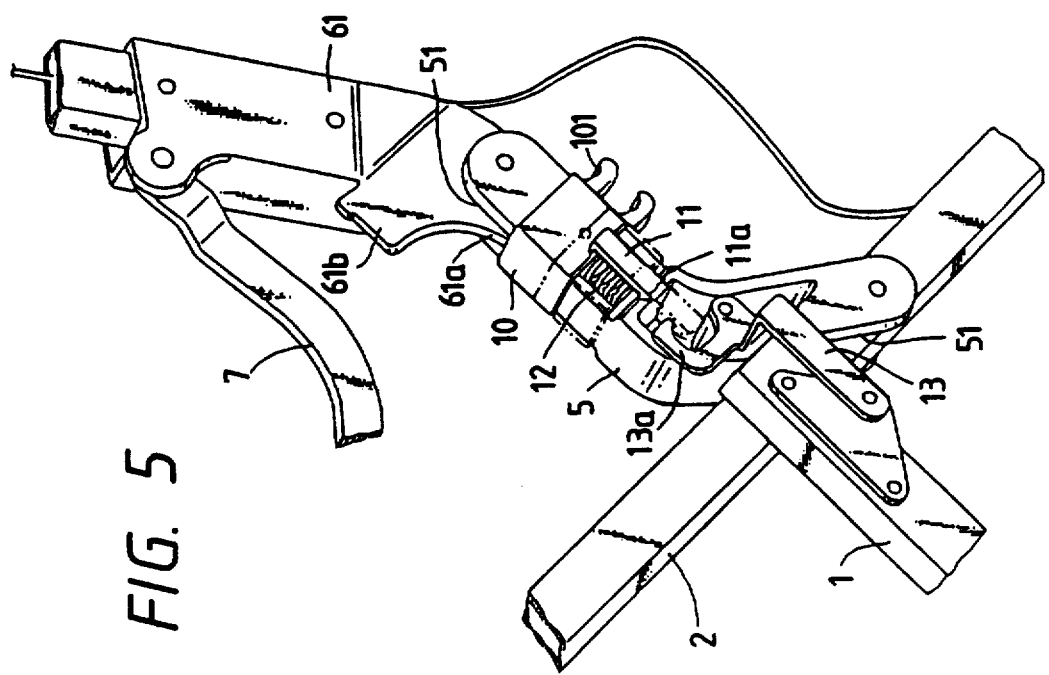
FIG. 6 is an enlarged exploded, side-elevational view of a portion of the pushcart.

The assembled condition of the pushcart is shown in FIGS. 1 to 3. When the pushcart in its assembled condition is to be folded, the front and rear legs 1 and 2 of the pushcart are moved toward each other, and the upstanding handle grip 6 is moved downwardly.

In the assembled condition, one engaging arm 61a of the L-shaped or inverted Y-shaped end of the retainer plate 61 on the lower end of the handle grip 6 is received in the groove 51 in the end of the bracket 5 to maintain the handle grip 6 in its upstanding condition. The stopper 10 maintains this condition (see FIGS. 3 to 5).

In this condition, first, the manipulation thumbpiece 101 of the stopper 10 is pressed down by the finger, so that the stopper 10 is slidingly moved downwardly along the bracket 5 toward the rear leg 2.

At this time, the stop-maintaining plate 11 formed on the side wall of the stopper 10 is moved downwardly together with the stopper 10, so that the retainer pawl 11a on the distal end of the stop-maintaining plate 11 is lockingly engaged with the retainer portion 13a of the retainer member 13 formed on the upper end of the front leg 1, thereby holding the stopper 10 against movement.

Figure 7:
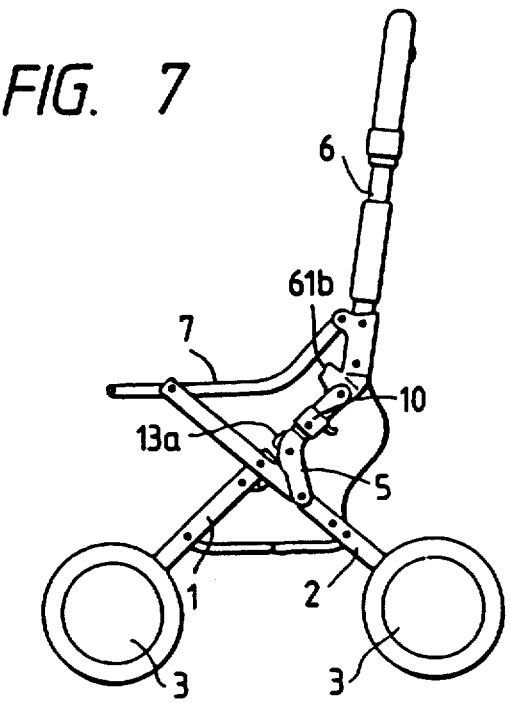
FIG. 7 is a side-elevational view of a frame or body of the pushcart in its assembled condition.

The engaging arm 61a, which has been received in the groove 51 and prevented by the stopper 10 from angular movement, can now be angularly moved relative to the bracket 5, so that the handle grip 6 can be moved downwardly (see FIG. 7).

Figure 8:
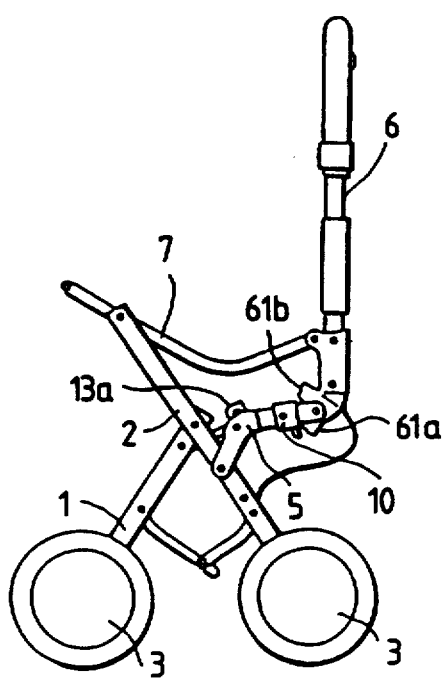
FIG. 8 is a side-elevational view of the frame, showing an initial stage of a folding operation.

It will be appreciated that the handle grip 6 can be moved downwardly since the engaging arm 61a is disengaged from the groove 51 of the bracket 5 (see FIG. 8).

As the handle grip 6 is moved downwardly, the bracket 5 pivotally connected to one end of the rear leg 2 is angularly moved downwardly about the pivot axis. At this time, since retainer member 13 remains stationary, the retainer pawl 11a becomes disengaged from the retainer portion 13a. Thus, a temporary locking engagement between the retainer pawl 11a and the retainer portion 13a is released.

Upon disengagement of the retainer pawl 11a from the retainer member 13, the stopper 10 is instantaneously returned toward the initial position under the influence of the spring 12 (see FIG. 8).

At this time, at an initial stage of the above returning movement, the engaging arm 61b has not yet been received in the groove 51 in the end of the bracket 5, and therefore the returning movement of the stopper 10 is limited by the retainer plate 61.

Then, when the handle grip 6 further moves downwardly and reaches its lower limit (i.e., the end of its downward stroke), the other engaging arm 61b of the bifurcated end of the retainer plate 61 is received in the groove 51 in the bracket 5.

Figure 9:
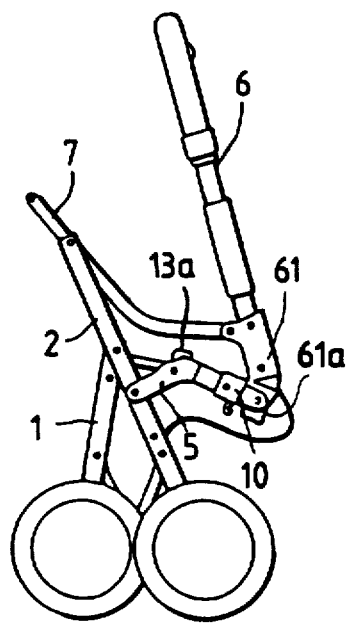
FIG. 9 is a view similar to FIG. 8, but showing the frame in the completely folded condition.

When the engaging arm 61b is received in the groove 51, the stopper 10 is moved by the spring 12 to its uppermost position, so that the engaging arm 61b is retained in the groove 51 by the stopper 10 (see FIG. 9).

Among the above operations, the only operations that are carried out manually by the operator are the downward sliding movement of the stopper 10 and the downward movement of the handle grip 6. The other operations follow automatically.

(ii) The Construction Shown in FIGS. 10 to 20

The folding operation in this case is the same as that described above in the above item (i), and the only differences are the portion with which the retainer pawl 11a on the distal end of the stop-maintaining plate 11 is engaged, and the mechanism for releasing this engagement. Therefore, only these differences will be described below.

Figure 13:
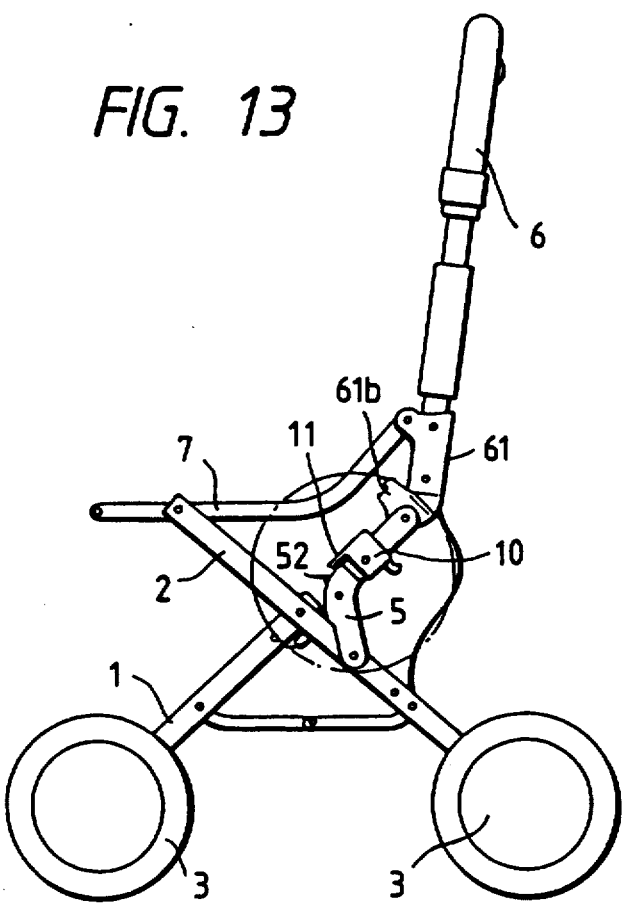
FIG. 13 is a side-elevational view of a frame of the pushcart of FIG. 10, showing the sliding movement of a stopper to effect the folding operation.
Figure 14:
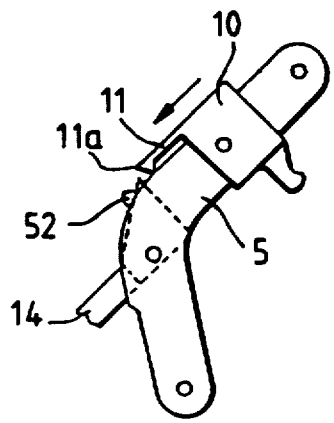
FIG. 14 is an enlarged side-elevational view of a portion of the pushcart of FIG. 10, showing the operation of the stopper.
Figure 15:
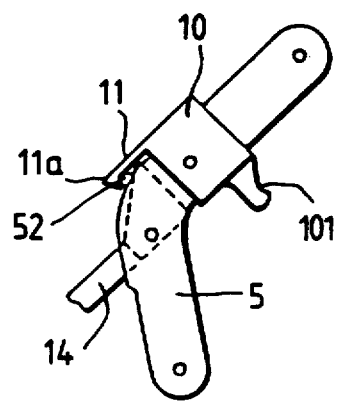
FIG. 15 is a view similar to FIG. 14, but showing the stopper at the end of its sliding stroke.

In this embodiment, when the stopper 10 in the condition shown in FIGS. 10 and 11 is slidingly moved in a direction of an arrow indicated in FIG. 14, the stopper 10 is disengaged from the engaging arm 61a, and the retainer pawl 11a on the distal end of the stop-maintaining plate 11 is lockingly engaged with the retainer projection 52 on the inner surface of the bent portion of the bracket 5, so that the stopper 10 is held against movement (see FIGS. 13 and 15).

Figure 16:
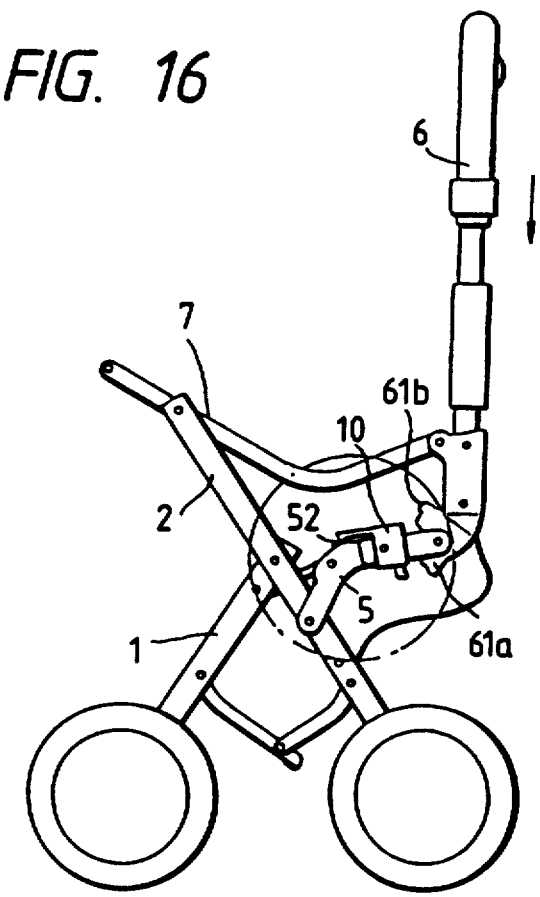
FIG. 16 is a side-elevational view of the frame of the pushcart of FIG. 10, showing an initial stage of the folding operation.
Figure 17:
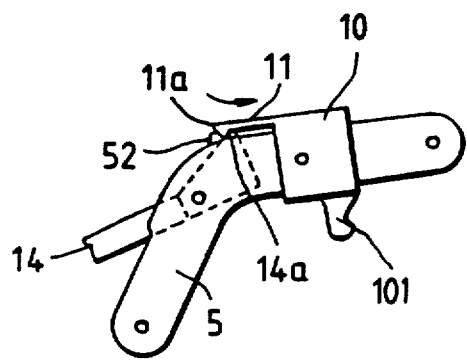
FIG. 17 is a view similar to FIG. 14, but showing the initial stage of the folding operation.

In this condition, when the handle grip 6 is moved downwardly in a direction of an arrow shown in FIG. 16, the operating projection 14a of the raising plate 14 disposed in contact with the underside of the stop-maintaining plate 11 raises or upwardly urges this plate 11, thereby releasing the engagement of the retainer pawl 11a with the retainer projection 52 (see FIGS. 17 to 20).

When the retainer pawl 11a is thus disengaged from the retainer projection 52 by the operating projection 14a, the retainer pawl 11a is instantaneously disposed between a valley defined by the retainer projection 52 and the operating projection 14a. Then, when the downward movement of the handle grip 6 further proceeds, the retainer pawl 11a slides over the operating projection 14a as shown in FIG. 19 into the position shown in FIG. 20, so that the stopper 10 fits on and holds the engaging arm 61b. Thus, the folding operation is completed (see FIG. 18).

2. Assembling Operation

The assembling operation can be carried out by reversing the operations described in the above items (i) and (ii).

Figure 18:
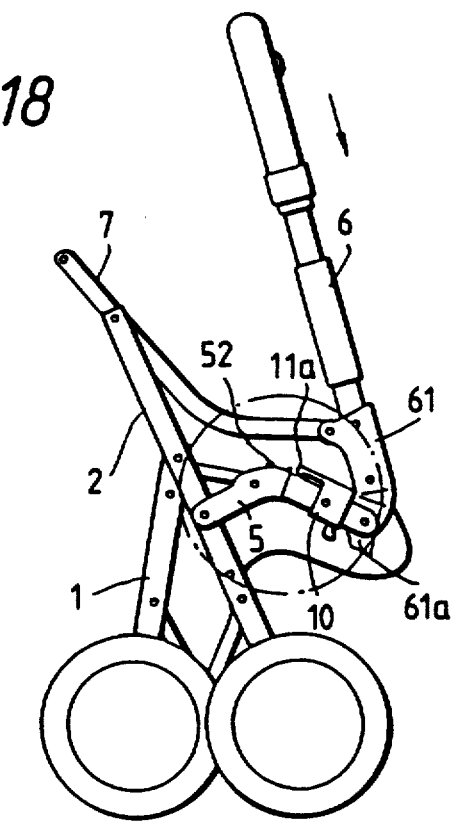
FIG. 18 is a side-elevational view of the frame of the pushcart of FIG. 10 in the completely folded condition.
Figure 19:
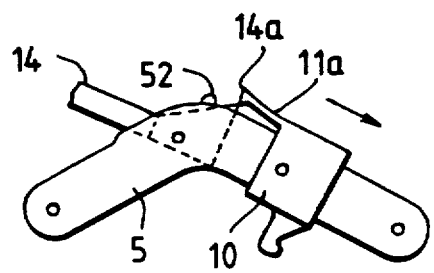
FIG. 19 is a view similar to FIG. 14, but showing a final stage of the folding operation.
Figure 20:
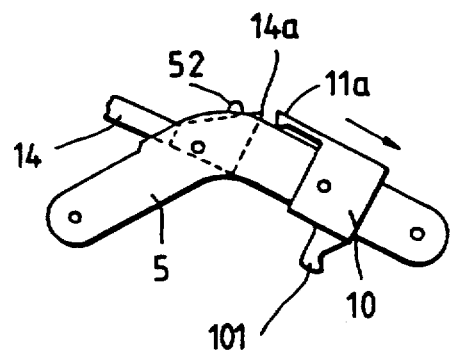
FIG. 20 is a view similar to FIG. 14, but showing the completely folded condition.

More specifically, first, the stopper 10 of the pushcart in its folded condition shown in FIG. 9 or FIG. 18 is slidingly moved toward the rear leg 2, so that the stopper 10 is disengaged from the engaging arm 61b.

As a result, the retainer pawl 11a of the stop-maintaining plate 11 is lockingly engaged with the retainer member 13 or the retainer projection 52 on the bracket 5.

In this condition, when the handle grip 6 is moved upwardly, the engaging arm 61a is received in the groove 51 in the bracket 5.

During the above operation, the retainer pawl 11a is disengaged from the retainer portion 13a or the retainer projection 52 in accordance with the pivotal movement of the bracket 5, and as a result the engaging arm 61a is positively kept received in the groove 51 by the stopper 10. Thus, the pushcart can be assembled instantaneously.

The following advantages are achieved by the present invention:

(1) When the pushcart is in its assembled condition or its folded condition, the engaging arm 61a or the engaging arm 61b is received in the groove 51 in the end of the bracket 5. At this time, the engaging arm 61a (61b) is positively held in the groove 51 by the stopper 10 mounted on the bracket 5 for sliding movement therealong. Therefore, the assembled condition and the folded condition are positively maintained in a stable manner.

(2) The stopper 10 mounted on the bracket 5 can be temporarily stopped or held stationary by the retainer pawl 11a of the stop-maintaining plate 11. Therefore, the manipulations for the folding and assembling operations are safe, and such stationary condition of the stopper 10 is automatically released during the assembling and folding operations. Therefore, even people who have little mechanical knowledge can easily handle the pushcart.

What is claimed is:

1. A folding and lock mechanism for a pushcar of the type having front and rear legs and a handle grip, all constituting part of a frame of said pushcart, comprising:

a bracket pivotally mounted at a first end on a rear face of one of said rear legs at a point thereon intermediate opposite ends of said rear leg such that said bracket is pivotally moveable between a generally upstanding position and a lower position;

a retainer plate formed on a lower end of said handle grip, said retainer plate having a bifurcated end of a generally L-shape or inverted Y-shape defined by a pair of engaging arms, said retainer plate being pivotally connected to a second end of said bracket at that portion of said retainer plate where said pair of engaging arms merge together; and a tubular stopper fitted on the second end portion of said bracket and being slidingly movable along said bracket, said stopper fitting on and retaining either of said pair of engaging arms which is selectively fitted in said second end of said bracket.

2. A folding and lock mechanism as claimed in claim 1, further comprising a retainer member attached at one end thereof to one of said front legs and having an engaging arm at the other end thereof;

said stopper having a stop maintaining plate with a pawl thereon extending away from said retainer plate; said pawl being engageable with said engaging arms temporarily when said stopper is moved away from said retainer plate to release either of said pair of engaging arms.

3. A folding and lock mechanism as claimed in claim 1, further comprising;

a retainer projection projecting upward from said bracket on the part of said bracket which is between said rear leg and said stopper;

said stopper having a stop-maintaining plate with a pawl thereon extending away from said retainer plate;

said pawl being engageable with said retainer projection temporarily when said stopper is moved away from said retainer plate to release either of said pair of engaging arms.

4. A folding and lock mechanism as claimed in claim 3 further comprising:

a raising plate connected at one end to a said front leg and having an operating projection at the other end;

said raising plate being shaped and positioned to lift said pawl and release it from said retainer projection as said bracket moves away from either extreme upstanding a lower positions.

5. A folding and lock mechanism as claimed in any of claims 1-4 further comprising spring biasing means urging said stopper towards said retaining plate.

6. A folding and lock mechanism as claimed in claim 5, wherein said bracket second end is bifurcated to form a groove at its distal end; said arms of said retainer plate passing into and out of said groove when not held therein by said stopper.

7. A folding and lock mechanism as claimed in claim 5 further comprising:

a thumbpiece extending outwardly from said stopper to permit manual pressure thereon for overcoming said spring biasing means to release either arm of said retaining plate.

8. A folding and lock mechanism as claimed in claim 7, wherein said bracket in generally V-shaped and swings downward from its upstanding position when said thumbpiece is manually depressed and said handle is pressed down, to cause said pushcart to fold into a position, wherein one of said arms is released from said stopper when the folding begins and the other arm is locked in said stopper when said folding ends.

* * * * *